United States Patent
Li et al.

(10) Patent No.: US 12,474,438 B1
(45) Date of Patent: Nov. 18, 2025

(54) METHOD AND APPARATUS FOR TARGET SENSING

(71) Applicant: TP-Link Systems Inc., Irvine, CA (US)

(72) Inventors: Haozheng Li, Chengdu (CN); Yaoshen Cui, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 19/169,942

(22) Filed: Apr. 3, 2025

(51) Int. Cl.
| | |
|---|---|
| *G01S 7/00* | (2006.01) |
| *G01S 13/56* | (2006.01) |
| *G01S 13/86* | (2006.01) |
| *H04W 4/02* | (2018.01) |
| *H04W 84/12* | (2009.01) |

(52) U.S. Cl.
CPC .............. *G01S 7/006* (2013.01); *G01S 13/56* (2013.01); *G01S 13/86* (2013.01); *H04W 4/02* (2013.01); *H04W 84/12* (2013.01)

(58) Field of Classification Search
CPC ....... G06F 3/017; H04W 4/029; H04W 84/12; H04W 4/80; H04W 4/02; H04W 84/18; H04W 4/38; H04W 48/16; H04W 4/021; H04W 4/027; H04W 4/33; H04W 64/00; H04W 4/025; H04W 64/006; H04W 64/003; G01S 13/56; G01S 7/415; G01S 7/006; G01S 13/003; G01S 13/878; G01S 13/04; G01S 5/0284; G01S 13/06; G01S 13/62; G06V 40/20
See application file for complete search history.

(56) References Cited

U.S. PATENT DOCUMENTS

| | | |
|---|---|---|
| 11,006,245 B2 | 5/2021 | Omer |
| 11,823,543 B2 | 11/2023 | Beg et al. |
| (Continued) | | |

FOREIGN PATENT DOCUMENTS

| | | |
|---|---|---|
| CN | 106534239 A | 3/2017 |
| CN | 115879678 A | 3/2023 |
| CN | 116997026 A | 11/2023 |

OTHER PUBLICATIONS

C. Wu, B. Wang, O. C. Au and K. J. R. Liu, "Wi-Fi Can Do More: Toward Ubiquitous Wireless Sensing," in IEEE Communications Standards Magazine, vol. 6, No. 2, pp. 42-49, Jun. 2022, doi: 10.1109/MCOMSTD.0001.2100111. (Year: 2022).*

*Primary Examiner* — Olumide Ajibade Akonai
(74) *Attorney, Agent, or Firm* — Loeb & Loeb LLP

(57) ABSTRACT

The present disclosure provides a method for target sensing and a sensing controller performing the method. The method includes: scheduling a first sensing system with a first sensing configuration and a first group of sensing devices; receiving first information including first status information of a target; and in response to the first status information indicating that a status of the target meets a first predefined condition and/or that a traffic distribution of the plurality of sensing devices meeting a second predefined condition, scheduling a second sensing system with a second sensing configuration and a second group of sensing devices selected from the plurality of sensing devices, and receiving second information including second status information of the target, wherein the first group of sensing devices is different from the second group of sensing devices, and/or wherein the first sensing configuration is different from the second sensing configuration.

20 Claims, 15 Drawing Sheets

(56) References Cited

U.S. PATENT DOCUMENTS

| | | | |
|---|---|---|---|
| 2013/0335302 A1* | 12/2013 | Crane | H04N 23/74 |
| | | | 348/169 |
| 2018/0239965 A1* | 8/2018 | Aggarwal | G01J 1/0266 |
| 2018/0288587 A1 | 10/2018 | Allegue Martinez et al. | |
| 2021/0209921 A1* | 7/2021 | Lin | A61B 5/6828 |
| 2022/0385433 A1* | 12/2022 | Rantala | H04J 13/0062 |
| 2024/0164662 A1* | 5/2024 | Kaplan | A61B 5/1113 |
| 2024/0179738 A1* | 5/2024 | Xu | H04W 4/80 |
| 2024/0292262 A1* | 8/2024 | Kim | H04W 24/08 |
| 2025/0142413 A1* | 5/2025 | Aygül | H04W 28/06 |
| 2025/0203734 A1* | 6/2025 | Elcock | G08B 21/043 |

\* cited by examiner

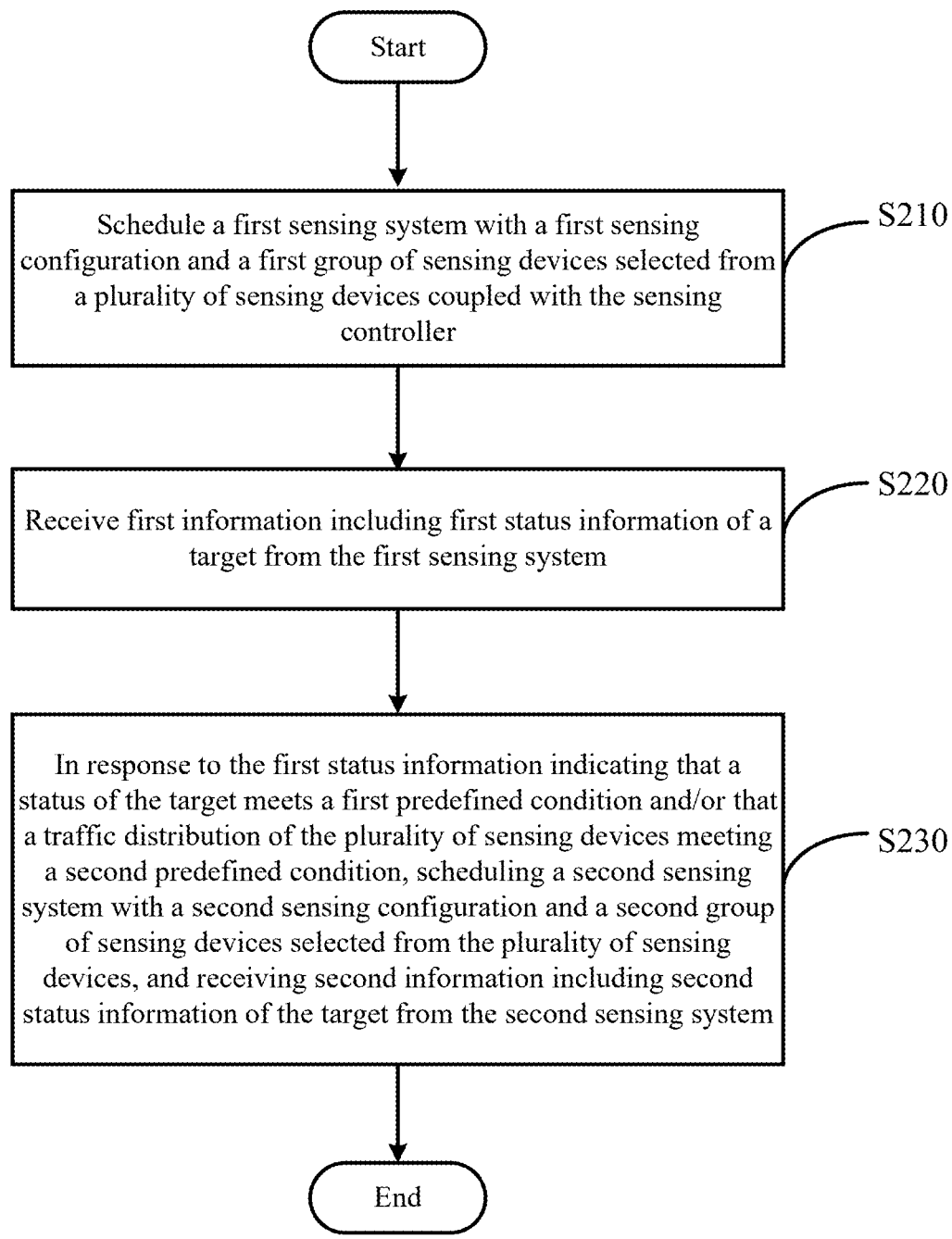

METHOD AND APPARATUS FOR TARGET SENSING

TECHNICAL FIELD

The present disclosure relates to Wi-Fi sensing technology, and in particular to a method for target sensing and a sensing controller for performing the method.

BACKGROUND

Nowadays, Wi-Fi sensing technology has been well-developed. The message exchanged during the interaction of a pair of Wi-Fi devices may contain information (e.g., the channel state information (CSI)) that is useful in identifying the target within the coverage of the pair of Wi-Fi devices.

With the rapid development of Wi-Fi technology and the Internet of Things (IoT), there are more and more Wi-Fi devices with the wireless sensing capability. For example, in an indoor environment, there may be a plurality of access points (APs) and a plurality of stations (STAs) that can perform target sensing. However, the wireless communication function is still the most important function required for Wi-Fi devices. The target sensing may cause additional message exchange among the Wi-Fi devices, which consumes the resources originally intended for the wireless communication function, resulting in degraded communication performance of the Wi-Fi devices.

SUMMARY

Aspects of the present disclosure provide a method for target sensing performed by a sensing controller. The method comprises: scheduling a first sensing system with a first sensing configuration and a first group of sensing devices selected from a plurality of sensing devices coupled with the sensing controller; receiving first information including first status information of a target from the first sensing system; and in response to the first status information indicating that a status of the target meets a first predefined condition and/or that a traffic distribution of the plurality of sensing devices meeting a second predefined condition, scheduling a second sensing system with a second sensing configuration and a second group of sensing devices selected from the plurality of sensing devices, and receiving second information including second status information of the target from the second sensing system, wherein the first group of sensing devices is different from the second group of sensing devices, and/or wherein the first sensing configuration is different from the second sensing configuration.

Other aspects of the present disclosure provide a sensing controller for target sensing. The sensing controller comprises: a memory; a processor coupled to the memory and configured for: scheduling a first sensing system with a first sensing configuration and a first group of sensing devices selected from a plurality of sensing devices coupled with the sensing controller; receiving first information including first status information of a target from the first sensing system; and in response to the first status information indicating that a status of the target meets a first predefined condition and/or that a traffic distribution of the plurality of sensing devices meeting a second predefined condition, scheduling a second sensing system with a second sensing configuration and a second group of sensing devices selected from the plurality of sensing devices, and receiving second information including second status information of the target from the second sensing system, wherein the first group of sensing devices is different from the second group of sensing devices, and/or wherein the first sensing configuration is different from the second sensing configuration.

Yet another aspect of the present disclosure provide a computer program product. The computer program product comprises computer-readable medium storing instructions thereon, when executed by a processor of an sensing controller, causes the processor to perform operations of: scheduling a first sensing system with a first sensing configuration and a first group of sensing devices selected from a plurality of sensing devices coupled with the sensing controller; receiving first information including first status information of a target from the first sensing system; and in response to the first status information indicating that a status of the target meets a first predefined condition and/or that a traffic distribution of the plurality of sensing devices meeting a second predefined condition, scheduling a second sensing system with a second sensing configuration and a second group of sensing devices selected from the plurality of sensing devices, and receiving second information including second status information of the target from the second sensing system, wherein the first group of sensing devices is different from the second group of sensing devices, and/or wherein the first sensing configuration is different from the second sensing configuration.

On the one hand, based on at least one embodiment of the present disclosure, a subset of the plurality of sensing devices may be scheduled to perform target sensing by taking into account the traffic of the sensing devices. This is advantageous for minimizing the impact of target sensing on the wireless communication performance of the sensing devices. On the other hand, based on at least one embodiment of the present disclosure, the scheduling of the sensing devices may be based on the change in the status of the target. This is advantageous for flexibly scheduling of additional sensing devices for the target sensing or setting finer sensing configurations for the target sensing when the target sensing is more important than the wireless communication function.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure but do not constitute a limitation on the present disclosure. In the drawings, unless otherwise explicitly indicated, the same reference numerals refer to the same components, steps or elements.

FIG. 2 is a schematic diagram illustrating an exemplary flowchart of a target sensing method according to at least one embodiment of the present disclosure;

DETAILED DESCRIPTION

Figure 1:
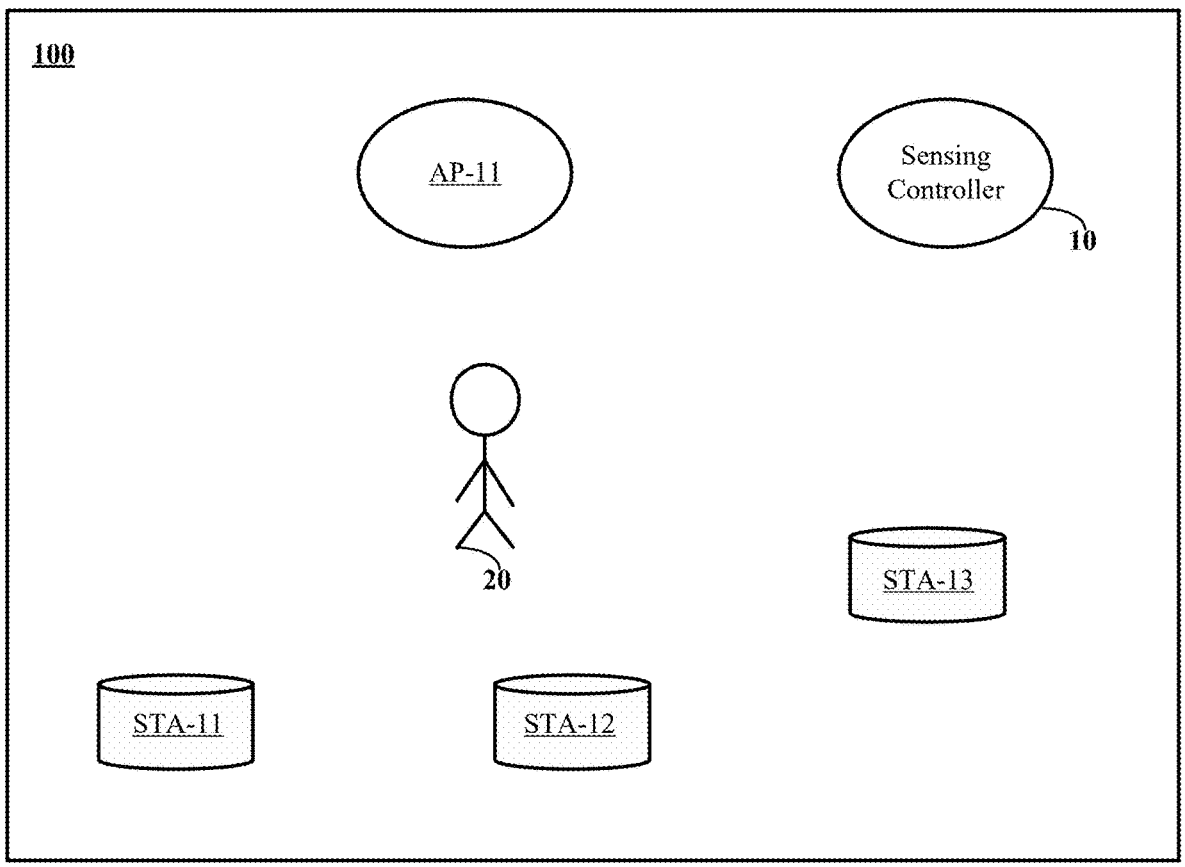
FIG. 1 is a schematic diagram illustrating an exemplary application scenario according to at least one embodiment of the present disclosure.

The technical solution of the present disclosure will be clearly and completely described below in conjunction with accompanying drawings. The described embodiments are part of embodiments of the present disclosure, but not all of them. Based on the embodiments in the present disclosure, all other embodiments acquired by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined as long as no conflicts occur therebetween.

Some of the drawings may not depict all the components of a given method, device and system. Like reference numerals may be used to denote like features throughout the specification and drawings.

FIG. 1 is a schematic diagram illustrating an exemplary application scenario according to at least one embodiment of the present disclosure.

Referring to FIG. 1, there are AP-11, STA-11, STA-12 and STA-13 deployed in a room 100, and the sensing coverage of each of the AP-11, STA-11, STA-12 and STA-13 may cover the entire room 100. Target 20 is located within the room 100. The STA-11, STA-12 and STA-13 may communicate with the AP-11. The AP-11 may communicate with the sensing controller 10. In an example, the STA-11, STA-12 and STA-13 may also communicate with the sensing controller 10. The AP-11 and the STA-11 to STA-13 may perform the target sensing and wireless communication. Each of the AP-11 and the STA-11 to STA-13 may be configured with a set of sensing algorithms for the target sensing.

The set of sensing algorithms may include posture sensing algorithm, position sensing algorithm trajectory prediction algorithm, heart rate sensing algorithm, respiratory rate sensing algorithm, etc. and other algorithm(s) that may be used to identify the characteristic of the target 20. Each of STA-11 to STA-13 may be laptop, desktop, smartphone, tablet, smart watch, game console, smart printer, or any other device that may perform the target sensing and Wi-Fi wireless communication. The sensing controller 10 may be integrated into the AP-11, or may be separate from any one of the AP-11 and the STA-11 to STA-13. The sensing controller 10 may also be deployed in a cloud. The cloud may refer to a remote infrastructure or platform that may communicate with the AP-11 and the STA-11 to STA-13 over the Internet.

FIG. 2 is a schematic diagram illustrating an exemplary flowchart of a target sensing method according to at least one embodiment of the present disclosure.

Referring to FIG. 2, the target sensing method 200 may include steps S210 to S230.

In the step S210, the sensing controller 10 may schedule a first sensing system with a first sensing configuration and a first group of sensing devices selected from a plurality of sensing devices coupled with the sensing controller 10. The word "coupled" here may include direct or indirect connection. For the exemplary application scenario as shown in FIG. 1, the AP-11 may be directly connected to the sensing controller 10, and the STA-11 to STA-13 may be indirectly connected to the sensing controller 10 via the AP-11.

In this step, the first sensing configuration may include configuration parameters used to configure the target sensing of the first sensing system, such as the message exchange rate among the sensing devices in the first sensing system 120, the frequency band used by the first sensing system 120, and/or the message transmission power among the sensing devices, during the target sensing.

Figure 3A:
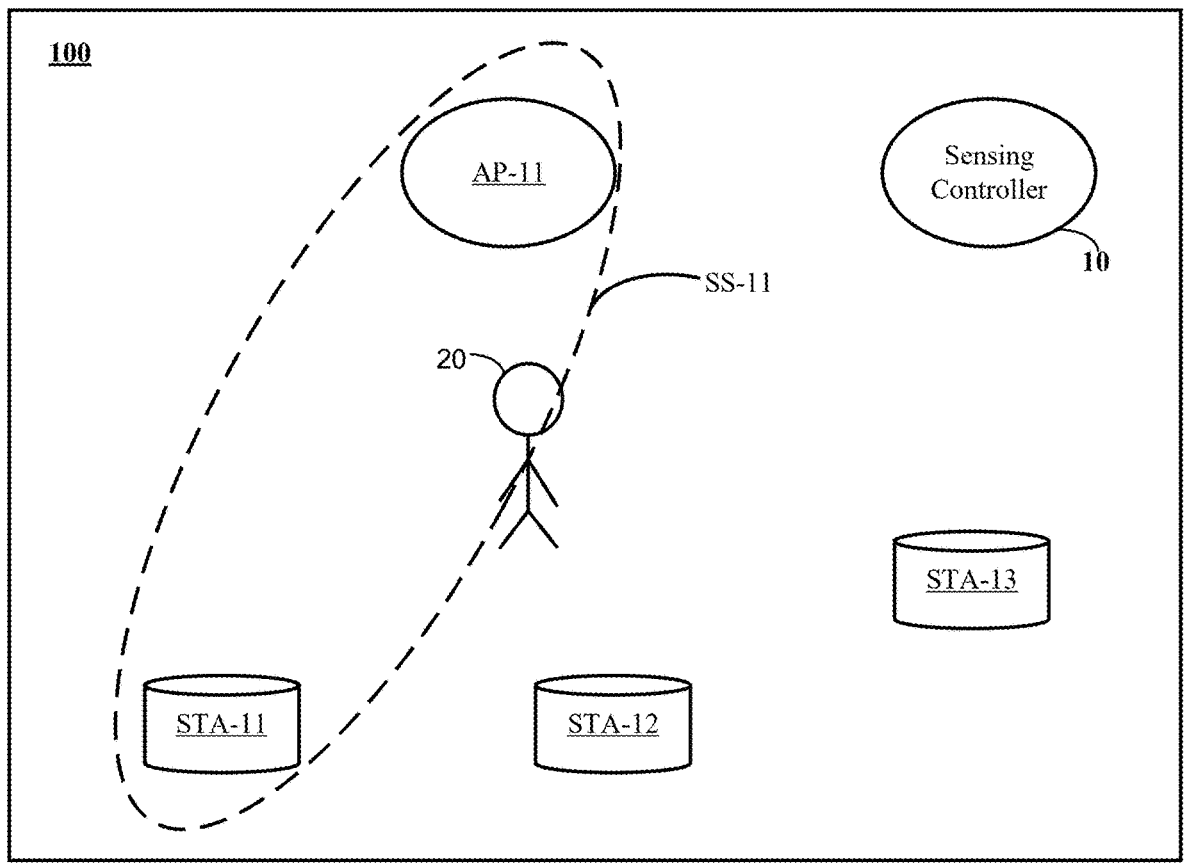
FIG. 3a is a schematic diagram illustrating an exemplary first sensing system according to at least one embodiment of the present disclosure.

FIG. 3a is a schematic diagram illustrating an exemplary first sensing system according to at least one embodiment of the present disclosure. As shown in FIG. 3a, the sensing controller 10 may initially schedule the first sensing system SS-11 including the AP-11 and the STA-11 for the target sensing.

In the step S220, the sensing controller 10 may receive the first information including the first status information of the target 20 from the first sensing system.

In this step, the first status information may include data that may be used to identify the posture (such as standing, sitting, lying down, bending, reaching, kneeling postures etc.) of the target 20 or the motion (such as body leaning or tilting, rapid downward movement of the body, hitting the ground, etc.) of the target 20, and/or the vital signs (such as the heart rate and/or the respiratory rate) of the target 20. For example, when the target 20 moves or adopts a certain posture, the body of the target 20 interacts with the Wi-Fi signals exchanged between AP-11 and STA-11, thereby causing a change in various aspects, such as the signal strength, phase, the channel state information (CSI), the time-of-flight, the Doppler effect, etc., of the Wi-Fi signals to occur. Technique that may identify the posture and/or the vital signs of the target 20 using the messages exchanged between a pair of Wi-Fi devices have been developed.

In the step S230, in response to the first status information indicating that the status of the target 20 meets the first predefined condition and/or that the traffic distribution of the plurality of sensing devices meeting the second predefined condition, the sensing controller 10 may schedule the second sensing system 130 with the second sensing configuration and a second group of sensing devices selected from the plurality of sensing devices, and receiving the second information including the second status information of the target from the second sensing system.

In this step, the difference between the first sensing system and the second system includes the difference between the first group of sensing devices and the second group of sensing devices, and/or the difference between the first sensing configuration and the second sensing configuration. In other words, the first sensing system and the second sensing system may have the same sensing devices but different sensing configurations, the same sensing configurations but different sensing devices, or different sensing devices and different sensing configurations. That is, when the first status information indicates that the status of the target meets a first predefined condition and/or when a traffic distribution of the plurality of sensing devices meets a second predefined condition, the sensing controller 10 may change sensing devices for performing the target sensing or the sensing configuration for performing the target sensing or both.

Figure 3B:
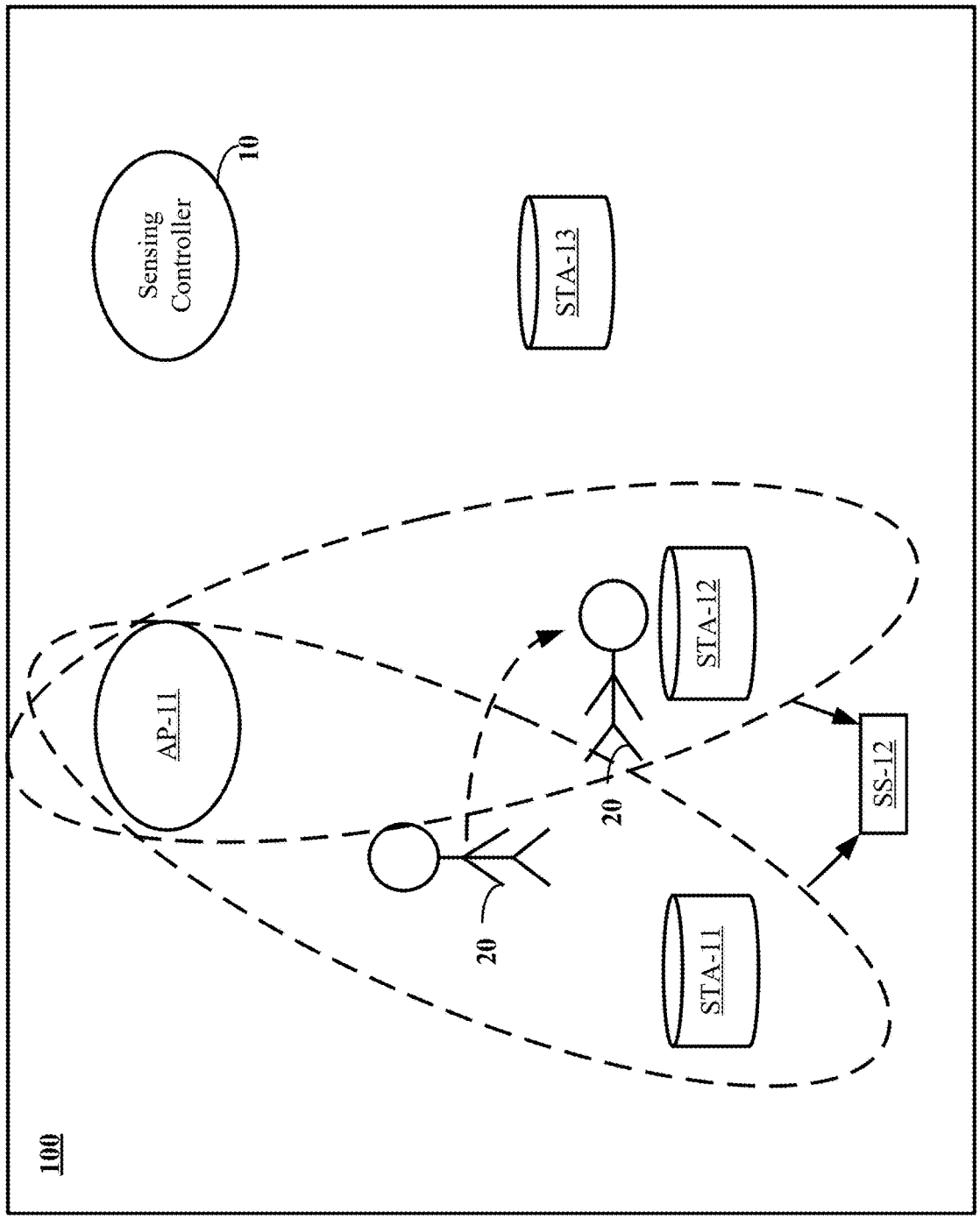
FIG. 3b is a schematic diagram illustrating an exemplary process of scheduling the second sensing system in response to the status of the target meeting a first predefined condition according to at least one embodiment of the present disclosure.

FIG. 3*b* is a schematic diagram illustrating an exemplary process of scheduling the second sensing system in response to the status of the target meeting a first predefined condition according to at least one embodiment of the present disclosure.

The sensing controller 10 may schedule the second sensing system as the sensing system SS-12 as shown in FIG. 3*b*, in response to the status of the target 20 meeting a first predefined condition.

The first predefined condition may include that a predetermined posture and/or a predetermined motion of the target 20 being sensed and/or at least one of the target's vital signs reaching its corresponding threshold. For example, bathrooms are high-risk areas for falls due to slippery surfaces, particularly when wet. Identifying whether the target 20 is in lying down posture or whether the target 20 is moving towards the lying down posture may be helpful in sensing a fall of the target 20, thereby triggering immediate alerts to family members or emergency services. For example, the lying down posture of the target 20 in the bathroom may indicate that the target 20 has fallen. If the target 20 is transitioning from a standing or sitting posture to a lying down posture, particularly if the target 20 is tilting or making a rapid downward movement of the body and is about to hit the ground, the movement of the target 20 during this period may indicate that the target 20 is in the process of falling. Alternatively, or in addition, identifying the heart rate or the respiratory rate of the target 20 may also be helpful in sensing medical emergency of the target. In the case where the room 100 is a bathroom, the first predefined condition may include, for example, the target 20 being sensed as lying down, and/or the target's heart rate being below 60 beats per minute and/or the target's respiratory rate being below 12 breaths per minute.

It should be noted that the first predefined condition listed above is provided for illustrative purposes only. The present disclosure does not limit the first predefined condition. The first predefined condition may change as the characteristic of the room 100 changes.

In the step S230, the sensing controller 10 may use the posture sensing algorithm to identify the posture of the target and may use the heart rate sensing algorithm and/or the respiratory rate sensing algorithm to identify the heart rate and/or the respiratory rate of the target 20. Theses algorithm may be designed based on any known or future techniques that may identify the posture and/or the vital signs of the living beings based on the messages exchanged between a pair of Wi-Fi devices. Once the lying down posture is identified for the target 20, the heart rate of the target 20 is identified below 60 beats per minute, and/or the respiratory rate of the target 20 is identified below 12 breaths per minute, the sensing controller 10 may schedule the second sensing system SS-12. The sensing accuracy of the second sensing system SS-12 is greater than the first sensing system SS-11.

In one example, the sensing controller 10 may achieve the sensing accuracy of the second sensing system SS-12 greater than the sensing accuracy of the first sensing system SS-11 by increasing the number of sensing devices. As shown in FIG. 3*a* and FIG. 3*b*, the first sensing system includes the AP-11 and the STA-11 and the second system includes the AP-11, the STA-11 and the STA-12. That is, the STA-12 is additionally scheduled to perform the target sensing. The number of sensing devices of the second sensing system 130 is greater than that of the first sensing system 120.

In another example, the sensing controller 10 may achieve the sensing accuracy of the second sensing system SS-12 greater than the sensing accuracy of the first sensing system SS-11 by increasing the message exchange rate. For example, the sensing controller 10 may still use the AP-11 and the STA-11 for target sensing while increasing the message exchange rate between the AP-11 and the STA-11. The first sensing configuration of the first sensing system SS-11 may include the first message exchange rate among the sensing devices (e.g., the AP-11 and the STA-11) in the first group. The second sensing configuration of the second sensing system SS-12 may include the second message exchange rate among the sensing devices (e.g., still the AP-11 and the STA-11) in the second group. The second message exchange rate may be higher than the first message exchange rate. That is, the second group of sensing devices in the second sensing system SS-12 are the same as the first group of sensing devices in the first sensing system SS-11, but the second message exchange rate among the sensing devices in the second group of sensing devices is higher than the first message exchange rate among the sensing devices in the first group of sensing devices.

As such, according to at least one embodiment of the present application, the multiple sensing devices within the room 100 may be scheduled by taking into account the status of the target. This is advantageous for flexibly scheduling of additional sensing devices for the target sensing or setting finer sensing configuration parameters for the target sensing when a medical emergency occurs at the target 20. This may provide one or more of the following benefits: early detection of medical emergencies, timely assistance, reduced false alarms, and better monitoring of vulnerable individuals, thereby ensuring faster responses to the medical emergency.

Figure 3C:
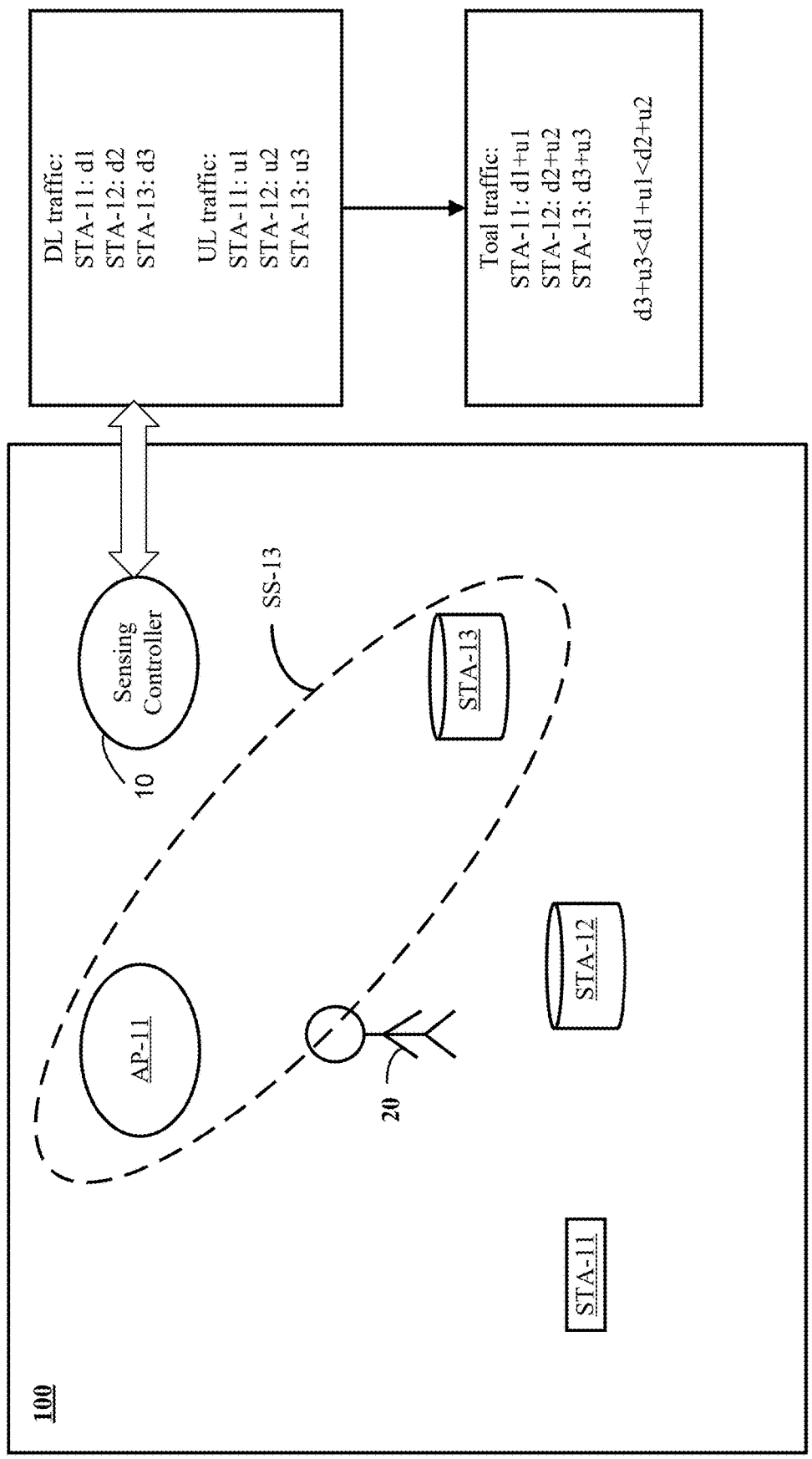
FIG. 3c is a schematic diagram illustrating an exemplary process of scheduling the second sensing system in response to the traffic distribution of the plurality of sensing devices meeting a second predefined condition according to at least one embodiment of the present disclosure.

FIG. 3c is a schematic diagram illustrating an exemplary process of scheduling the second sensing system in response to the traffic distribution of the plurality of sensing devices meeting a second predefined condition according to at least one embodiment of the present disclosure.

Alternatively, in the step S230, the sensing controller 10 may schedule the second sensing system as the sensing system SS-13 as shown in FIG. 3c in response to the traffic distribution of the plurality of sensing devices meeting a second predefined condition.

As mentioned above, it is expected to reduce the impact of the execution of the target sensing on the execution of the Wi-Fi communication as much as possible. Therefore, it is expected to use the sensing devices with traffic as little as possible to perform the target sensing. The second predefined condition may include that the traffic of the second group of the sensing devices is less than the traffic of the first group of the sensing devices.

Referring to FIG. 3c, the sensing controller 10 may obtain the traffic of the STA-11 to STA-13 by sending a traffic request to the AP-11 (e.g., the AP-11 may collect the information on the traffic of the STA-11 to STA-13 in response to the traffic request from the sensing controller 10), or by receiving a report associated with the traffic of the STA-11 to STA-13 from the AP-11 (e.g., the AP-11 may periodically or aperiodically collect the information on the traffic of the STA-11 to STA-13 and report it to the sensing controller 10). Assuming that the downlink traffic of the STA-11, the STA-12 and the STA-13 are d1, d2 and d3, respectively, and the uplink traffic of the STA-1, the STA-2 and the STA-3 are u1, u2 and u3, respectively. The sensing controller 10 may determine the total traffic of the STA-11, the STA-12 and the STA-13 as d1+u1, d2+u2 and d3+u3, respectively, and then determine the STA-13 has the minimum traffic based on d3+u3<d1+u1<d2+u2. As a result, the AP-11 and the STA-13 are scheduled as the second sensing system to perform the target sensing. The STA-11 is disabled to perform the target sensing.

As such, according to at least one embodiment of the present application, the multiple sensing devices within the room 100 may be scheduled by taking into account the traffic of the sensing devices. This enables the sensing devices for target sensing be selected as the sensing devices having the minimum traffic, thereby reducing the impact of target sensing on the wireless communication performance of the sensing devices.

It should be noted that, the example shown in FIG. 3c is provided only as illustrative, but not limiting. The sensing controller 10 may also determine the total traffic of all pairwise combinations among the STA-11 to the STA-13 and then select the two STAs with the minimum total traffic from them. For example, if the traffic of two or three of the STA-11 to the STA-13 are very low (such that the wireless communication on them are hardly impacted by the execution of target sensing), the sensing controller 10 may schedule the two or three of the STA-11 to the STA-13 as the second group of sensing devices in the second sensing system. Thus, the target sensing and the wireless communication of the sensing devices may be better traded off.

Figure 4:
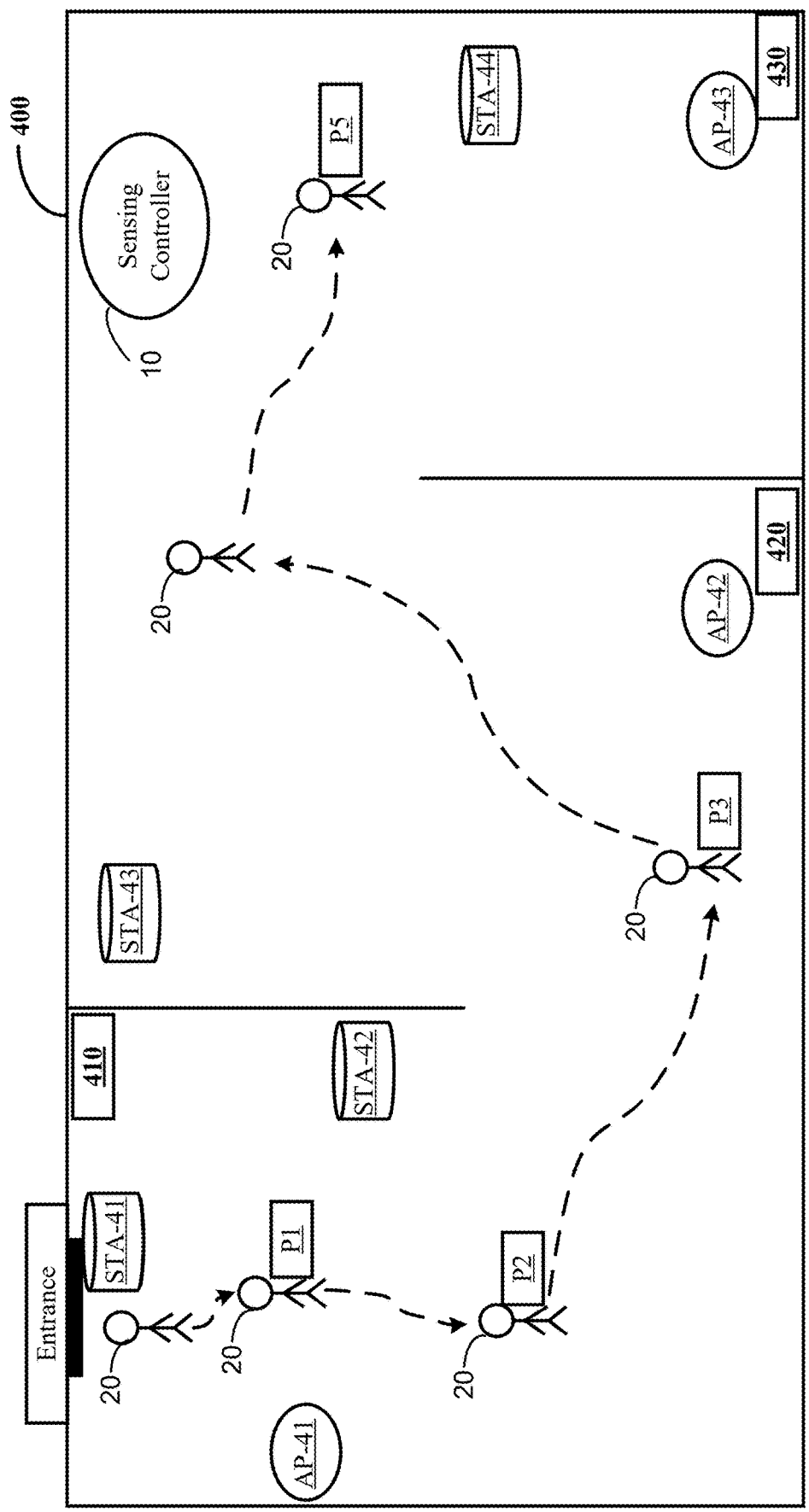
FIG. 4 is a schematic diagram illustrating another exemplary application scenario according to at least one embodiment of the present disclosure.

FIG. 4 is a schematic diagram illustrating another exemplary application scenario according to at least one embodiment of the present disclosure.

Referring FIG. 4, there are three rooms in the house 400, including the living room 410, the bathroom 420 and the bedroom 430. The entrance to the house 400 (e.g., the door) is located in the living room 410. The AP-41, the STA-41 and the STA-42 are deployed in the living room 410. The AP-42 and the STA-43 are deployed in the bathroom 420. The AP-43, the STA-44 are deployed in the bedroom 430. The AP-41, the AP-42 and the AP-43 may communicate with each other. The STA-41 and the STA-42 are located within the coverage of the AP-41 and thus may communicate with AP-41. The STA-43 is located within the coverage of the AP-42 and thus may communicate with AP-42. The STA-44 is located within the coverage of the AP-43 and thus may communicate with AP-43. Each of the AP-41 to AP-43 and the STA-41 to STA-44 may simultaneously perform wireless communication and target sensing. Each of STA-41 to STA-44 may be laptop, desktop, smartphone, tablet, smart watch, game console, smart printer or any other device that may simultaneously perform wireless communication and target sensing.

The sensing controller 10 according to at least one embodiment of the present disclosure may be deployed integrated into one of AP-41 to the AP-43 and the STA-41 to STA-44, may be separate from any one of AP-41 to the AP-43 and the STA-41 to STA-44, or may be deployed in a cloud. The cloud refers to a remote infrastructure or platform that may communicate with AP-41 to the AP-43 and the STA-41 to STA-44 over the Internet.

As shown in FIG. 4, the house 400 is large such that the sensing coverage of at least one of the AP-41 to the AP-43 and the STA-41 to STA-44 may not always cover the target 20 with the movement of the target 20 within the space 400. In this case, the change in the position of the target 20 may be taken into account in the scheduling of the sensing devices.

Figure 5:
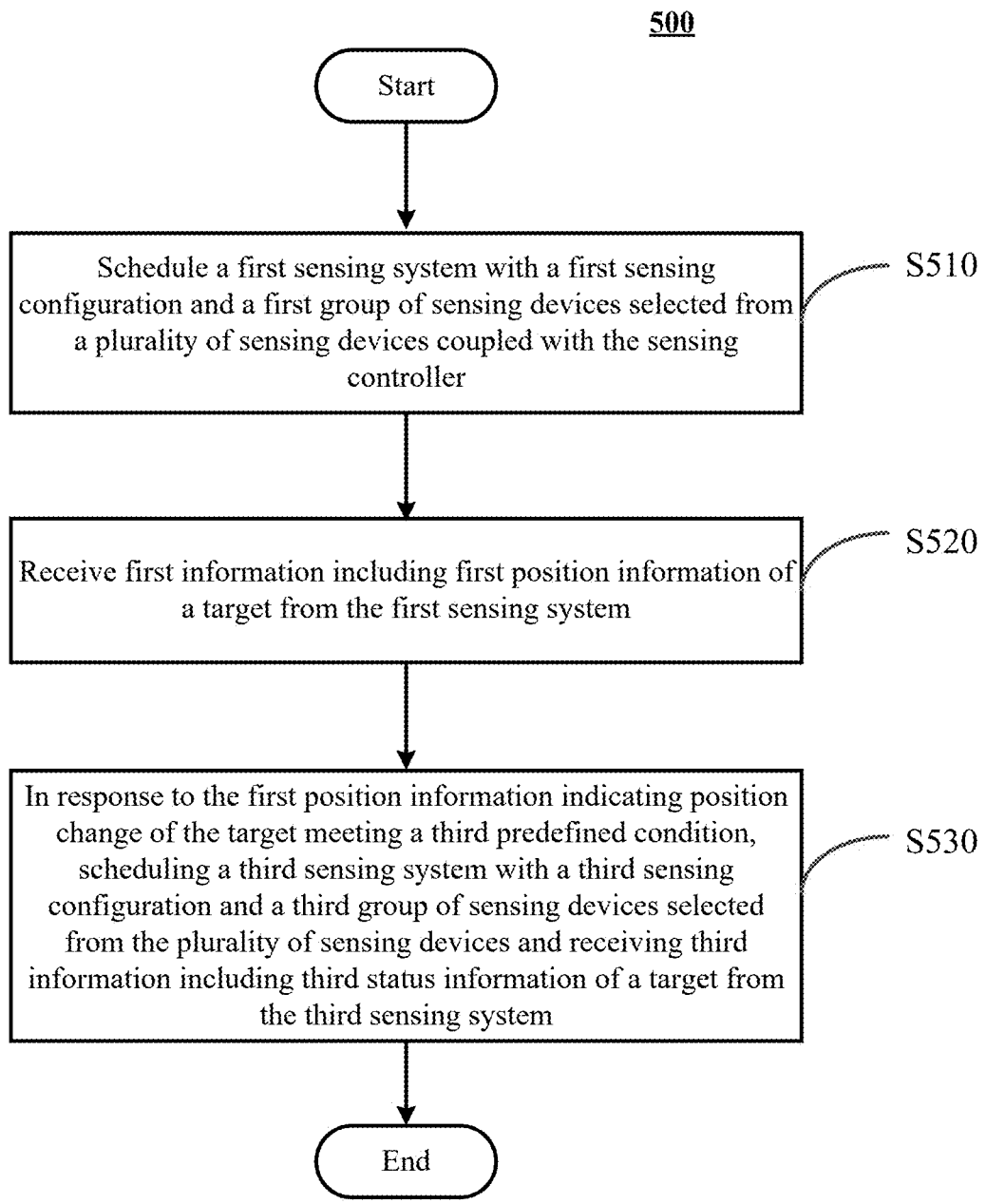
FIG. 5 is a schematic diagram illustrating an exemplary flowchart of another target sensing method according to at least one embodiment of the present disclosure.

FIG. 5 is a schematic diagram illustrating an exemplary flowchart of the another target sensing method according to at least one embodiment of the present disclosure.

Referring to FIG. 5, the method 500 may include steps S510 to S530.

Figure 6A:
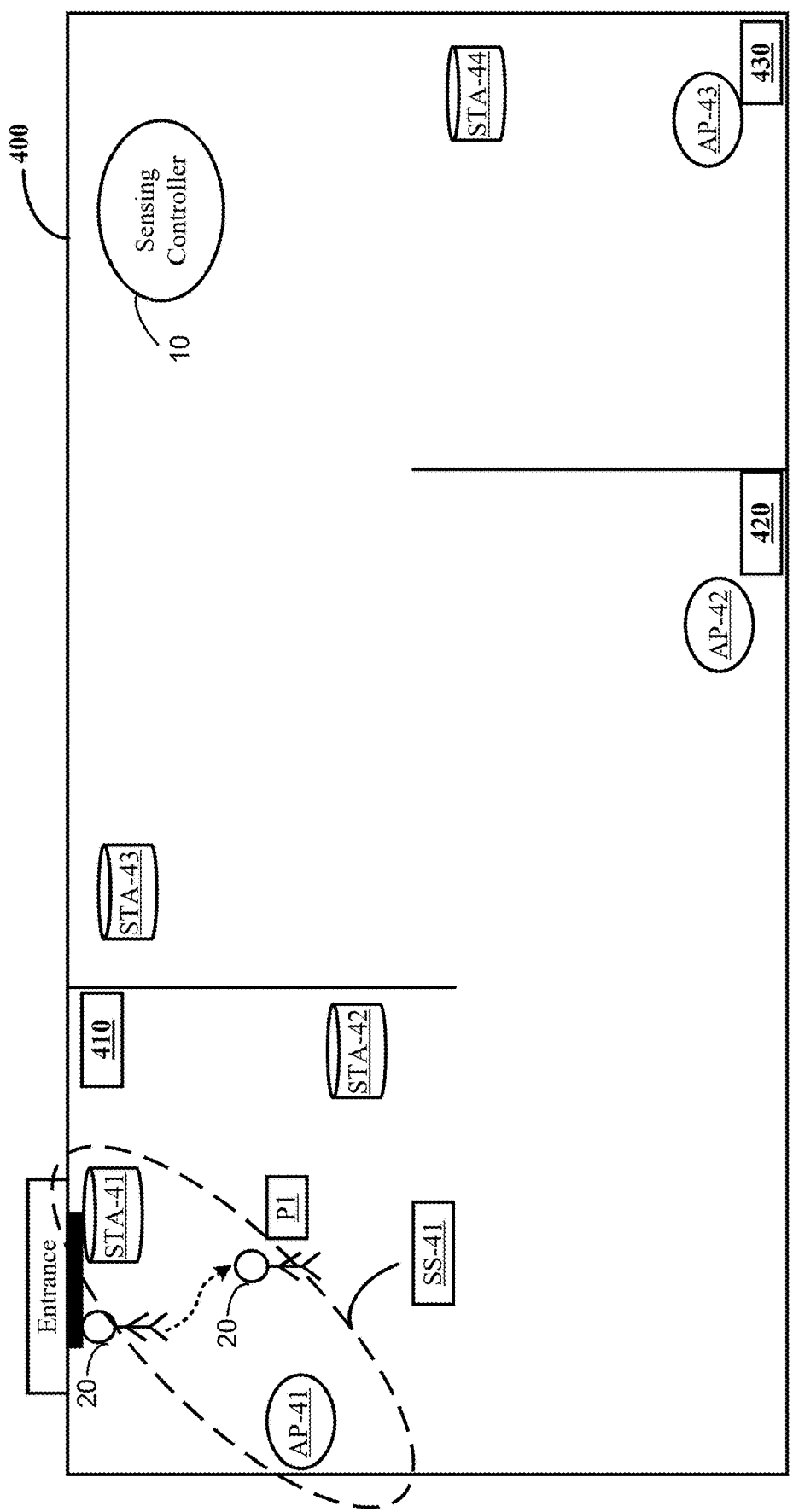
FIGS. 6a to 6f are schematic diagrams illustrating an exemplary process for the another target sensing method according to at least one embodiment of the present disclosure.

The step S510 is similar to the step of S210. As shown in FIG. 6a, the sensing controller 10 may initially schedule the AP-41 and the STA-41 as first sensing system SS-41 for performing target sensing. Each of AP-41 and the STA-41 may be configured with the set of sensing algorithms for the target sensing as mentioned above.

At the step S520, the sensing controller 10 may receive first information including first position information of a target 20 from the first sensing system SS-41.

In this step, the first position information may include the first position information of the target 20, such as data that may used to identify the position of the target 20. Referring to FIG. 4, with the movement of the target 20 from one position to another position, the body of the target 20 interacts with the Wi-Fi signals exchanged between any pair of AP and STA as shown in FIG. 4, thereby causing the change in various aspects, such as the signal strength, phase, the channel state information (CSI), the time-of-flight, the Doppler effect, etc., of the Wi-Fi signals to occur. Technique that may identify the position of the target located within the coverage of a pair of Wi-Fi devices using the messages exchanged between the pair of wireless devices have been developed.

At the step S530, in response to the first position information indicating position change of the target 20 meeting a third predefined condition, scheduling a third sensing system with a third sensing configuration and a third group of sensing devices selected from the plurality of sensing devices and receiving third information including third status information of a target from the third sensing system.

In this step, the third predefined condition may include that the distance between a central point of the sensing coverage of the third group of sensing device in the third sensing system and the changed position of the target is less than a distance between a central point of a sensing coverage of the first group of sensing devices in the first sensing system and the changed position of the target 20. That is, the sensing coverage of the third group of sensing device provide a more comprehensive or accurate coverage of the changed position than the sensing coverage of the first group of sensing devices in the first sensing system.

FIG. 6a to FIG. 6f are schematic diagrams illustrating an exemplary process for the method 500 according to at least one embodiment of the present disclosure.

Referring to FIG. 6a, at the beginning, the target 20 is not located within the house 400. The sensing controller 10 may use various methods to determine that the target 100 is not located within the house 10. For example, the sensing controller 10 may make this determination based on at least one of: a previously sensed information indicating that the target 20 has left the house 400, information sent by the target 20 indicating that the target 20 has left the house 400, information sent by the target 20 that the target 20 will soon return to the house 400, etc.

Based on the determination that the target 20 is not located within the house 50, the sensing controller 10 may schedule the AP-41 and the STA-41 in the living room 410 as the first group of sensing devices in the first sensing system SS-41 for performing the target sensing. The STA-41 may be a smart lock, a smart camera, a smart doorbell, a smart light or any other device that may be used to sense whether the target 20 enter through the entrance. Once the target 20 enters through the entrance, the AP-41 may receive a message indicating the appearance of the target 20 from the STA-41 and then report the first information including the first position information indicating the appearance of the target 20 to the sensing controller 10.

Based on receiving the first information including the first position information indicating the entry of the target 20, the sensing controller 10 may control the AP-41 and the STA-41 to enable the target positioning algorithm to sense the real-time position of the target 20.

Referring to FIG. 6a, the sensing controller 10 may determine that the target 20 has moved from the entrance to the position P1 based on the first position information included in the first information received from the AP-41 and/or the STA-41. The sensing controller 10 may determine that the position P1 is not only within the sensing coverage of the AP-41 and STA-41, but also within the sensing coverage of the STA-42 according to the network topology of the sensing devices in the house 400. The network topology may be pre-stored in the sensing controller 10. In this case, the sensing controller 10 may control the STA-42 to perform the sensing task such that the initial sensing systems SS-41 including the AP-41 and the STA-41 is switched to the sensing system SS-42 including the AP-41, the STA-41 and the STA-42, as shown in the FIG. 6b.

In addition, the sensing configuration of the sensing system SS-42 may be the same as or different from the sensing configuration of the sensing system SS-41. For example, the number of sensing algorithms configured by the sensing configuration of the sensing system SS-42 may be less than the number of sensing algorithms configured by the sensing configuration of the sensing system SS-41 to save computing and network resources. For example, the sensing configuration of the sensing system SS-41 may configure the AP-41 and the STA-41 to enable all the sensing algorithms in the set of sensing algorithms as mentioned above, the sensing configuration of the sensing system SS-42 may configure the AP-41, the STA-41 and the STA-42 to enable only the position sensing algorithms of the set of sensing algorithms.

Figure 6B:
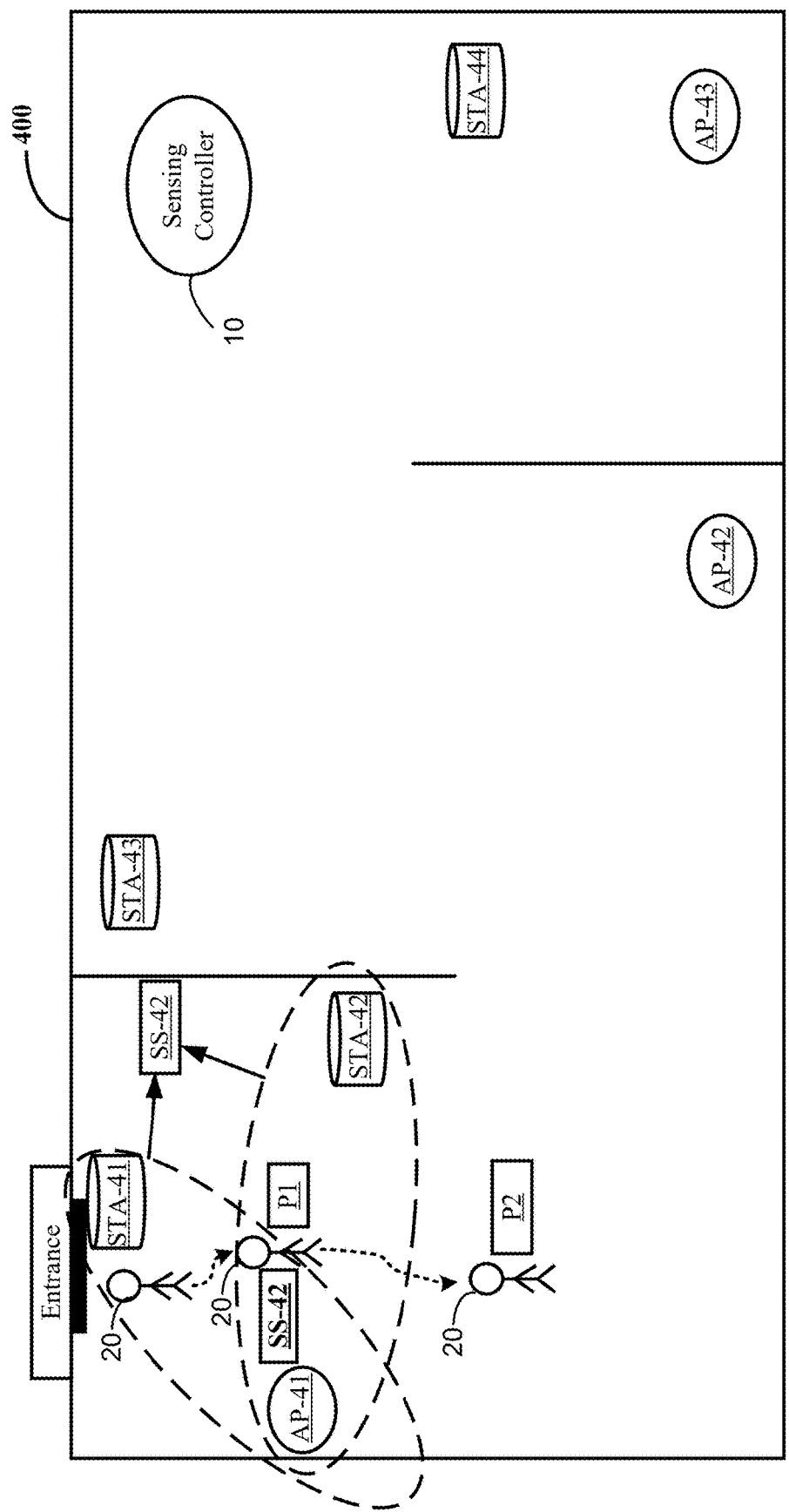

Referring to FIG. 6b, the sensing controller 10 may determine that the target 20 has moved from the position P2 to the position P3 based on the updated first position information included in the updated first information received from the AP-41, the STA-41 and/or the STA-42. The sensing controller 10 may determine that the position P2 is within the sensing coverage of the AP-41, the STA-42 and the AP-42 but is not within the sensing coverage of the STA-41 according to the network topology of the sensing devices in the house 400. In this case, the sensing controller 10 may control the STA-41 to stop performing the target sensing and control the AP-42 to start performing the target sensing, such that the sensing system SS-42 including the AP-41, the STA-41 and the STA-42 is switched to the sensing system SS-43 including the AP-41, the STA-42 and the AP-42, as shown in the FIG. 6c.

Similarly, the sensing configuration of the sensing system SS-43 may be the same as or different from the sensing configuration of the sensing system SS-42.

Figure 6C:
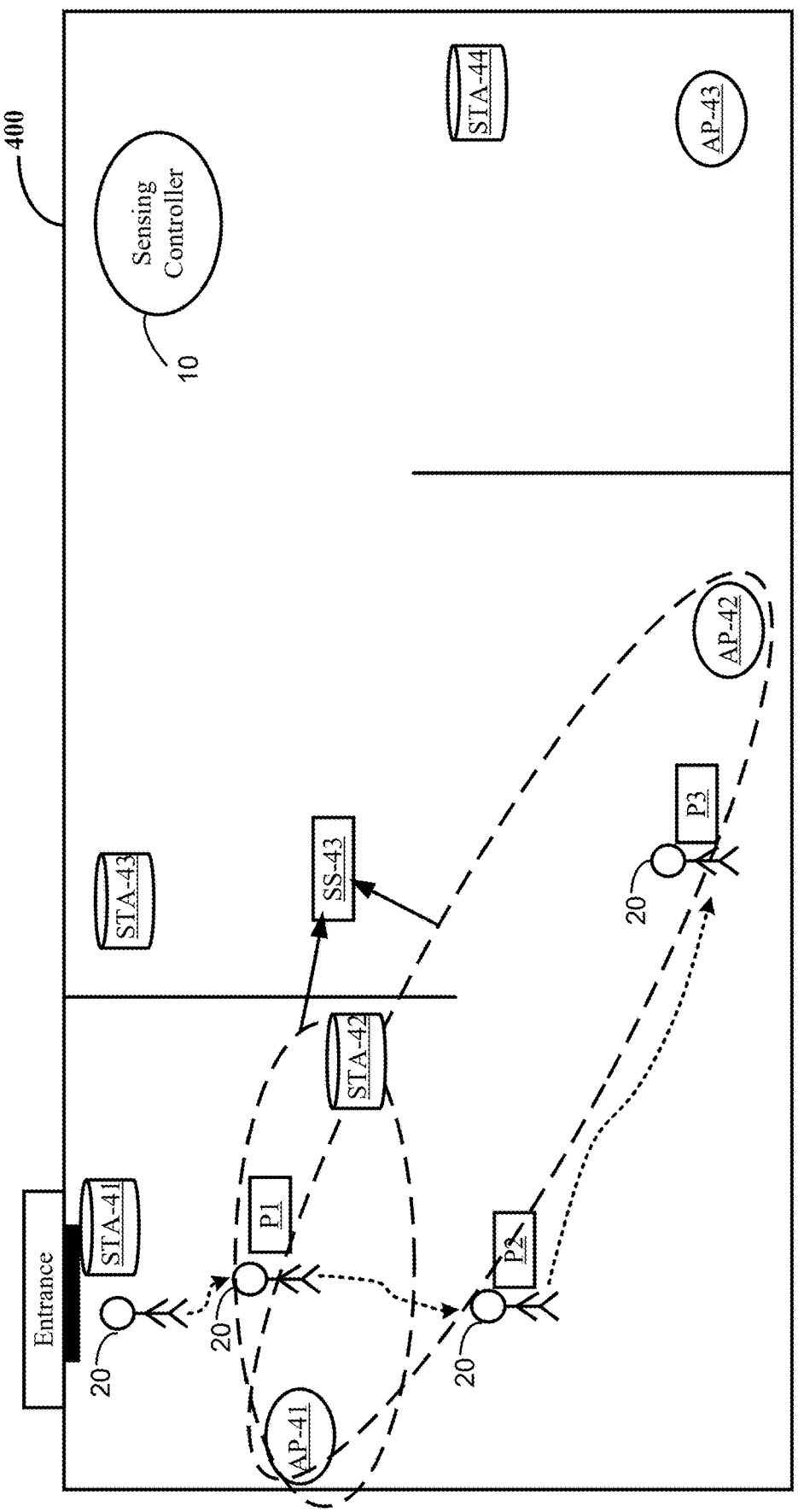

Referring to FIG. 6c, the sensing controller 10 may determine that the target 20 has moved from the position P2 to the position P3 based on the updated first position information included in the updated first information received from the AP-41, the STA-42 and/or the AP-42. The sensing controller 10 may determine that the position P3 is within the sensing coverage of the AP-41, the AP-42 and the STA-43, but is outside the sensing coverage of the STA-42 according to the network topology of the sensing devices in the house 400. In this case, the sensing controller 10 may control the STA-42 to stop performing the target sensing such that the sensing system SS-43 including the AP-41 and the STA-42 is switched into the sensing system SS-44 including the AP-41, the AP-42 and the STA-43, as shown in the FIG. 6d.

Similarly, the sensing system ssconfig-54 of the sensing system SS-44 may be the same as or different from the sensing system ssconfig-53 of the third sensing system.

Figure 6D:
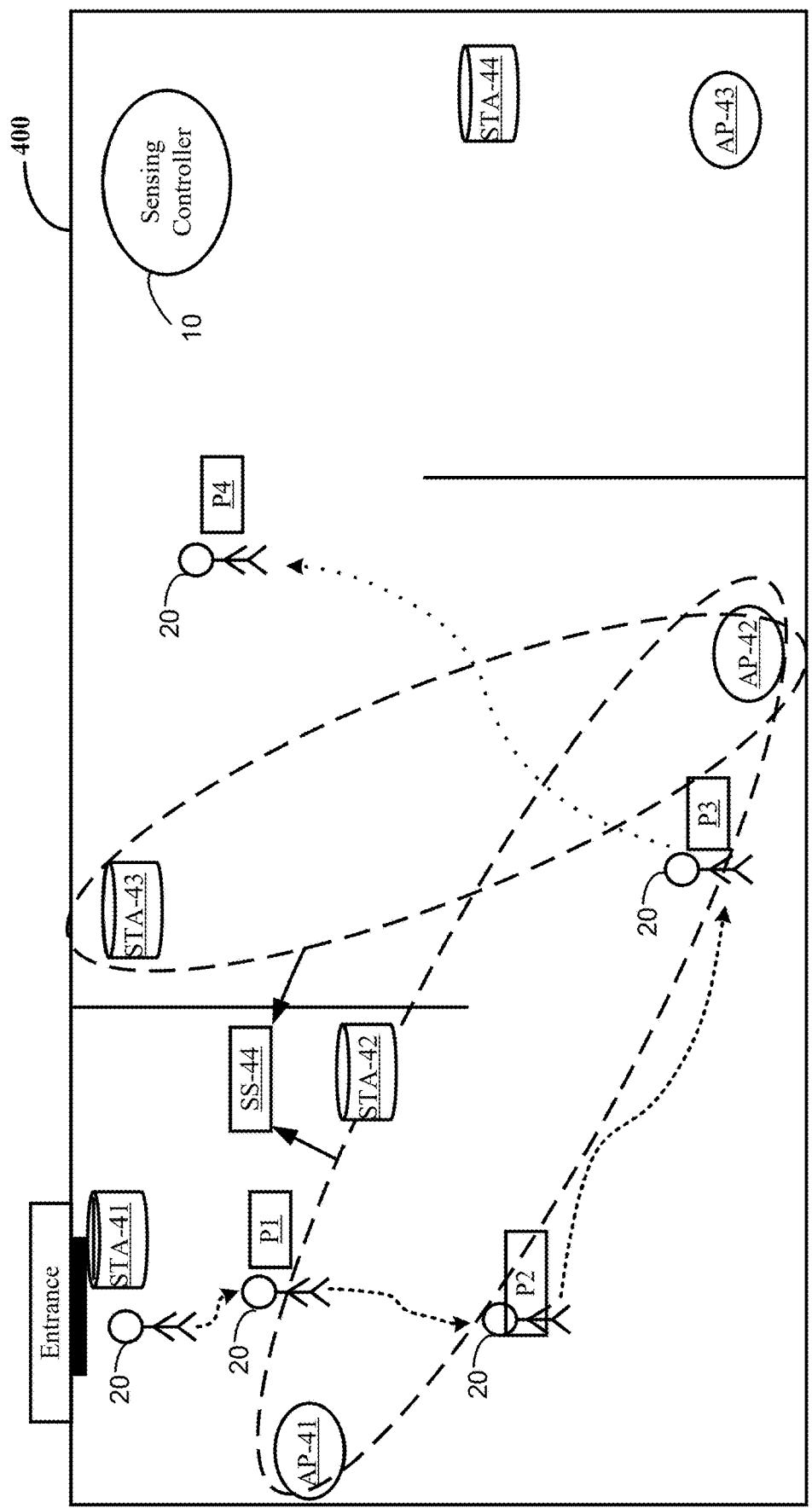

Referring FIG. 6d, during the movement of the target 20 from the position P3 to the position P4, the target 20 may firstly leave the sensing coverage of AP-41 and then leave the sensing coverage of AP-42 and the STA-43. However, there is no any sensing device may cover the position P4.

The sensing controller 10 may determine that the target 20 has moved from the position P3 to the position P4 based on the updated first position information included in the updated first information received from the AP-41, the AP-42 and/or the STA-43. The sensing controller 10 may further determine that there is no any sensing device may cover the position P4 according to the network topology of the sensing devices in the house 400. In this case, the sensing controller 10 may control the AP-41 to stop performing target sensing and control the AP-42 and the STA-43 to enable the trajectory prediction algorithm for predicting the next position of the target 20. That is, the sensing controller 10 may switch the sensing system SS-44 including the AP-41, the AP-42 and the STA-43 into the sensing system SS-45 including the AP-42 and the STA-43, and may set the sensing configuration of the sensing system SS-45 may configure the AP-42 and the STA-43 to execute the trajectory prediction algorithm. The AP-42 and the STA-43 may predict the next position of the target 20 is the position P5, as shown in the FIG. 6e.

Figure 6E:
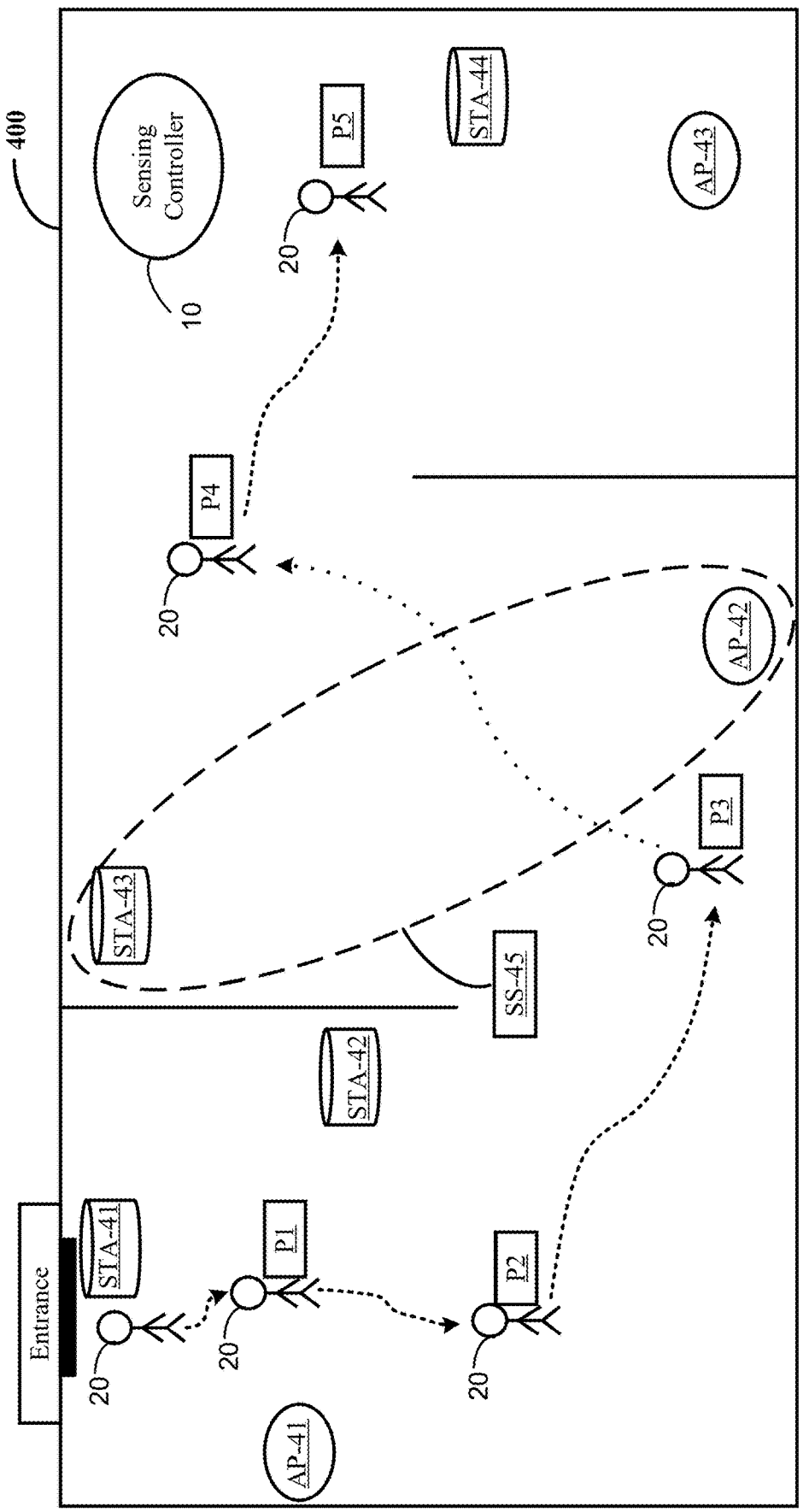
Figure 6F:
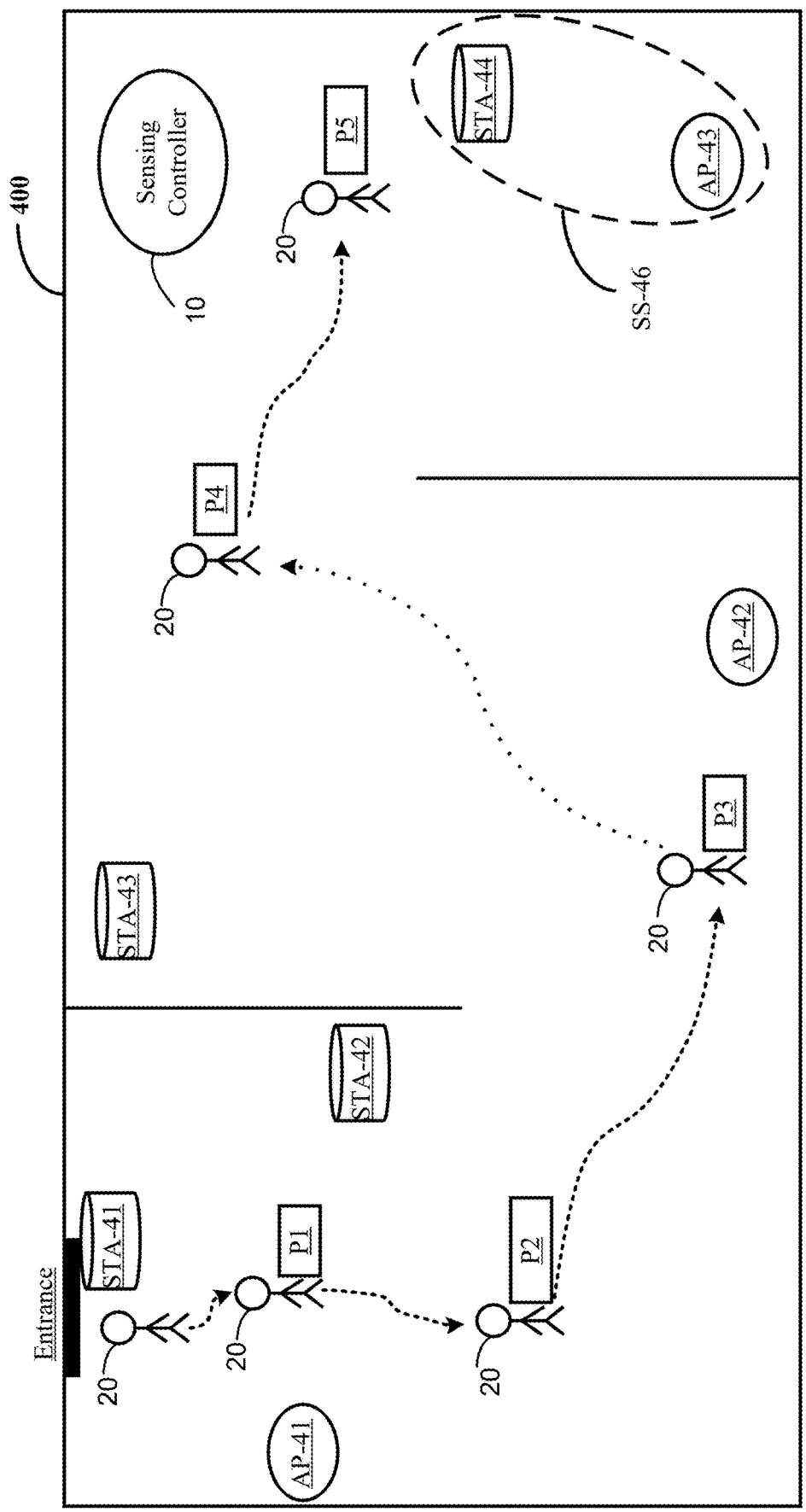

Referring to FIG. 6e, the sensing controller 10 may determine that the target 20 will arrive at the position P5 based on the updated first position information included in the updated first information received from the AP-42 and the STA-43, which indicates that the next position of the target 20 is the position P5. The sensing controller 10 may further determine the position P5 is located within the sensing coverage of the AP-43 and the STA-44 according to the topology of the sensing devices in the house 400. In this case, the sensing controller 10 may control the AP-42 and the STA-43 to stop performing the target sensing and control the AP-43 and the STA-44 to start performing the target sensing. That is, the sensing system SS-45 including the AP-42 and the STA-43 is switched into the sensing system SS-46 including the AP-43 and the STA-44, as shown in the FIG. 6f.

Similarly, the sensing configuration of the sensing system SS-46 may be the same as or different from the sensing configuration of the sensing system SS-45.

As such, according to at least one embodiment of the present application, the multiple sensing devices within the house 400 may be scheduled by taking into account the change in the position of the target 20. This allows that the target sensing to be performed only by the sensing devices whose sensing coverage covers the current position of the target, thereby scheduling as few sensing devices as possible for target sensing, resulting in the reduce of the impact of the target sensing on the performance of the wireless communication.

It should be appreciated that the target sensing method 200 may be applied in combination with the target sensing method 500. The change in the position of the target and the traffic of the sensing devices may be considered together for scheduling the sensing devices to perform target sensing.

Figure 7:
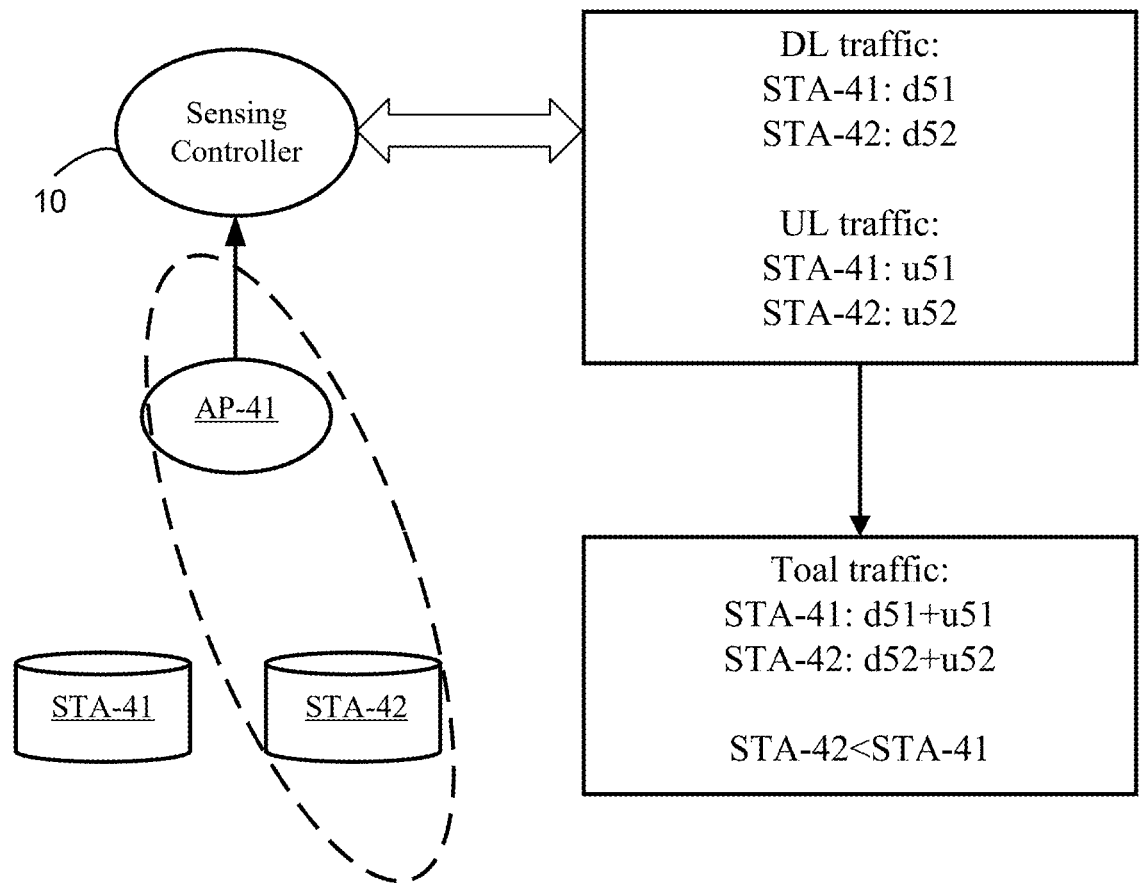
FIG. 7 is schematic diagram illustrating an exemplary further process for the example shown in FIG. 6b according to at least one embodiment of the present disclosure.

FIG. 7 is schematic diagram illustrating an exemplary further process for the example shown in FIG. 6b.

As an example, under the case shown in FIG. 6b, the sensing controller 10 has determine that the sensing system SS-42 including the AP-41, the STA-41 and the STA-42 is scheduled to perform the target sensing. In this case, the sensing controller 10 may further select one of the STA-41 and the STA-42 that has the lowest traffic to perform the target sensing. Referring FIG. 7, the sensing controller 10 may obtain the traffic distribution of the STA-41 and the STA-42 from the AP-41. The downlink traffic of the STA-41 and the STA-42 may be d51 and d52, respectively, and that the uplink traffic of the STA-41 and the STA-42 may be u51 and u52. Given that d52+u52<d51+u51, the sensing controller 10 may control the STA-41 to stop the target sensing and use the AP-41 and the STA-42 to perform the target sensing.

As such, by determining the sensing devices by considering both the change of the target position and the traffic of the sensing devices, the impact of the target sensing on the performance of the wireless communication may be further decreased.

In at least one embodiment, the sensing configuration of any one of the sensing systems mentioned above may indicate the frequency band to be used by the sensing system. The indicated frequency band is the frequency band having the least traffic from the multiple frequency bands available for the sensing system.

Figure 8:
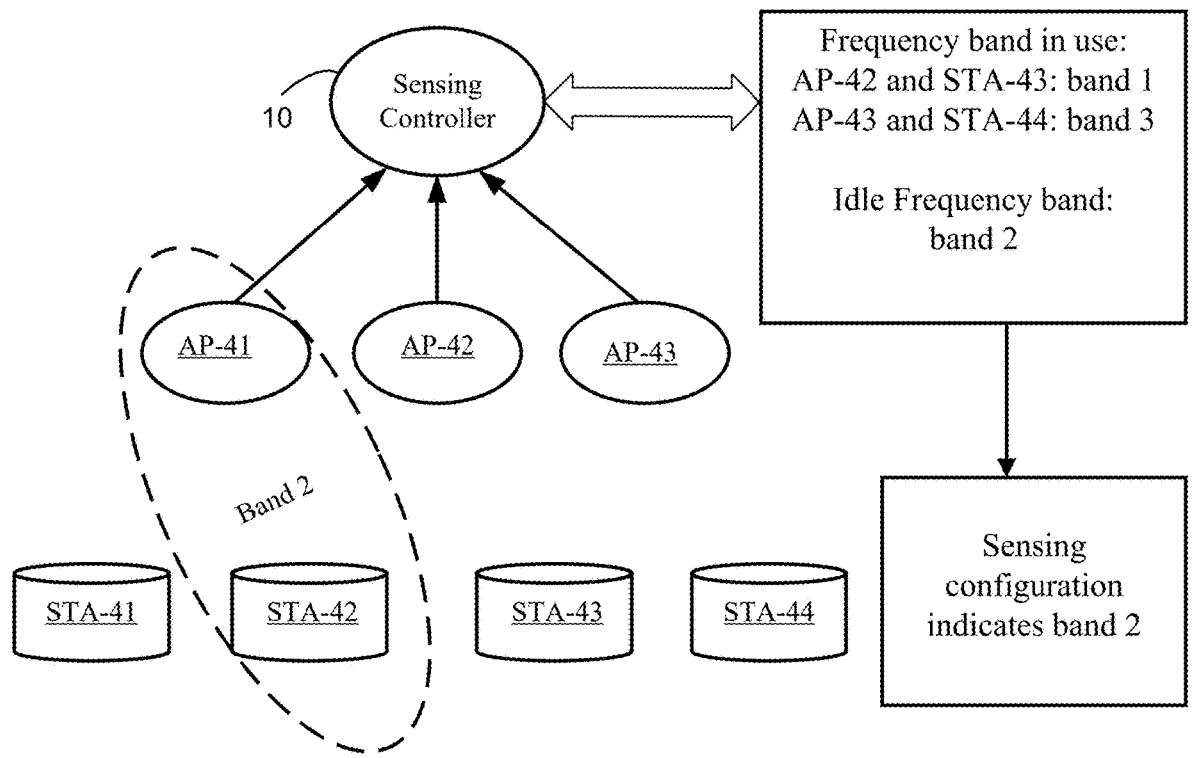
FIG. 8 is schematic diagram illustrating an exemplary further process for the example shown in FIG. 7 according to at least one embodiment of the present disclosure.

FIG. 8 is schematic diagram illustrating an exemplary further process for the example shown in FIG. 7 according to one embodiment.

Continuing the above example with reference to FIG. 7, the sensing controller 10 has determined to use the AP-41 and the STA-42 to perform the target sensing. In this case, the sensing controller 10 may further obtain the information indicating the traffic of each frequency band available for the AP-41 and the STA-42. Referring to FIG. 8, there are three bands, including band 1, band 2 and band 3 available for the sensing devices in the house 400. The sensing controller 10 determines that the band 1 is being used by the AP-42 and the STA-43, the band 3 is being used by the AP-43 and the STA-44, and band 2 is in idle. Therefore, the traffic on the band 2 is less than that on the band 1 or band 3. The sensing configuration for the sensing system including the AP-41 and the STA-42 may be set by the sensing controller 10 to indicate that the band 2 is to be used for target sensing.

As such, by further selecting the frequency band with the least traffic for target sensing, the impact of the target sensing on the performance of the wireless communication may be further reduced.

As shown FIGS. 3a to 3c and FIGS. 6a to 6f, each group of sensing devices of each sensing system (such as the sensing system SS-11 to SS-13 and SS-41 to SS-46) may include two or more sensing devices, and the two or more sensing devices may include at least one AP.

Figure 9:
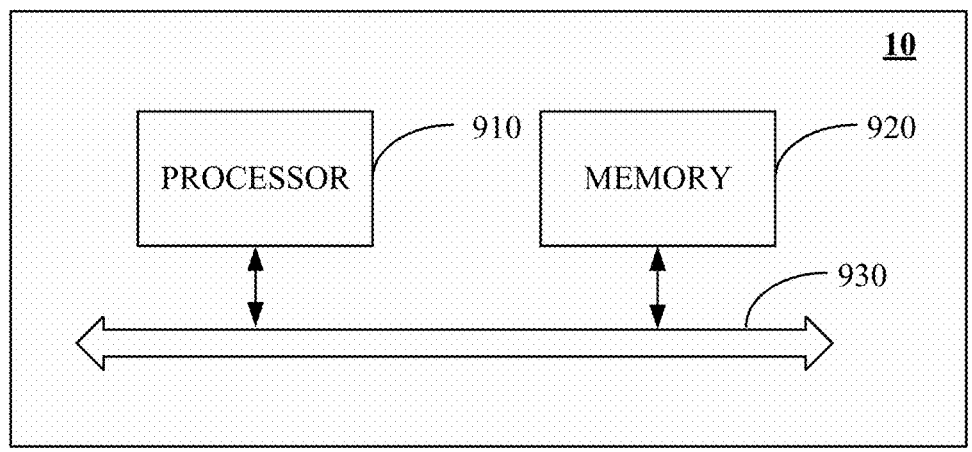
FIG. 9 is a schematic block diagram illustrating the sensing controller 10 for target sensing according to at least one embodiment of the present disclosure.

FIG. 9 is a schematic block diagram illustrating the sensing controller 10 for target sensing according to at least one embodiment of the present disclosure.

As shown in FIG. 9, the sensing controller 10 may comprise a processor 910 and a memory 920. The processor 910 may be coupled with the memory 920 via a communication bus 930 and may be configured to perform the method 200 and the method 500 discussed above.

Examples of processor 910 may comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout the present disclosure.

The processor 910 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 920.

The memory 920 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

In addition, according to another embodiment of the present disclosure, a computer program product for data transmission is disclosed. As an example, the computer program product includes a computer-readable medium having program instructions embodied therewith, and the program instructions are executable by a processor. When executed, the program instructions cause the processor to perform one or more procedures described above. The present disclosure may be a system, a method, and/or a computer program product at any possible technical detail level of integration. The computer program product may include a computer-readable storage medium having computer-readable program instructions thereon for causing a processor to carry out aspects of the present disclosure.

The present disclosure may be a system, a method, and/or a computer program product at any possible technical detail level of integration. The computer program product may include a computer-readable storage medium having computer-readable program instructions thereon for causing a processor to carry out aspects of the present disclosure.

An expression such as "according to", "based on", "dependent on", and so on as used in the disclosure does not mean "according only to", "based only on", or "dependent only on" unless it is explicitly otherwise stated. In other words, such expression generally means "according at least to", "based at least on", or "dependent at least on" in the disclosure.

The term "determining" used in the disclosure may include various operations. For example, regarding "determining", calculating, computing, processing, deriving, investigating, looking up (e.g., looking up in tables, databases, or other data structures), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth may also be regarded as "determining". That is, regarding "determining", several actions may be regarded as "determining".

The terms such as "connected", "coupled" or any of their variants used in the disclosure refer to any connection or combination, direct or indirect, between two or more units, which may include the following situations: between two units that are "connected" or "coupled" with each other, there are one or more intermediate units. The coupling or connection between the units may be physical or logical, or may also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for target sensing performed by a sensing controller comprising:
    scheduling a first sensing system with a first sensing configuration and a first group of sensing devices selected from a plurality of the sensing devices coupled with the sensing controller;
    receiving first information including first status information of a target from the first sensing system; and
    in response to the first status information indicating that a status of the target meets a first predefined condition and/or that a traffic distribution of the plurality of the sensing devices meeting a second predefined condition, scheduling a second sensing system with a second sensing configuration and a second group of the sensing devices selected from the plurality of the sensing devices, and receiving second information including second status information of the target from the second sensing system,
    wherein the first group of the sensing devices is different from the second group of the sensing devices, and/or
    wherein the first sensing configuration is different from the second sensing configuration.

2. The method of claim 1, wherein the first predefined condition comprises:
    a predetermined posture and/or a predetermined motion of the target being sensed; and/or
    at least one of the target's vital signs reaches a corresponding threshold.

3. The method of claim 2, wherein a number of the plurality of the sensing devices in the second group is greater than a number of the plurality of the sensing devices in the first group.

4. The method of claim 2, wherein
    the first sensing configuration includes a first message exchange rate among the sensing devices in the first group;
    the second sensing configuration includes a second message exchange rate among the sensing devices in the second group; and
    the second message exchange rate is higher than the first message exchange rate.

5. The method of claim 1, wherein the second predefined condition comprises the traffic of the second group of the sensing devices is less than the traffic of the first group of the sensing devices.

6. The method of claim 1, wherein
    the first information includes first position information of the target; and
    the method further comprises:
        in response to the first position information indicating position change of the target meeting a third predefined condition, scheduling a third sensing system with a third sensing configuration and a third group of the sensing devices selected from the plurality of the sensing devices and receiving third information including third status information of a target from the third sensing system.

7. The method of claim 6, wherein the third predefined condition comprises:
a distance between a central point of a sensing coverage of the third group and the changed position of the target is less than a distance between a central point of a sensing coverage of the first group and the changed position of the target.

8. The method of claim 1, wherein
the first sensing configuration indicates one frequency band of a plurality of frequency bands having minimum traffic is to be used by the first sensing system; and/or
the second sensing configuration indicates one frequency band of the plurality of frequency bands having minimum traffic is to be used by the second sensing system.

9. The method of claim 6, wherein each of the first, the second and the third group of the sensing devices includes two or more sensing devices, and the two or more sensing devices includes at least one access point (AP).

10. The method of claim 9, wherein the sensing controller is integrated into at least one AP of the plurality of the sensing devices or separate from any one of the plurality of the sensing devices.

11. A sensing controller comprising:
a memory;
a processor coupled to the memory and configured for executing instructions comprising:
scheduling a first sensing system with a first sensing configuration and a first group of sensing devices selected from a plurality of the sensing devices coupled with the sensing controller;
receiving first information including first status information of a target from the first sensing system; and
in response to the first status information indicating that a status of the target meets a first predefined condition and/or that a traffic distribution of the plurality of the sensing devices meeting a second predefined condition, scheduling a second sensing system with a second sensing configuration and a second group of the sensing devices selected from the plurality of the sensing devices, and receiving second information including second status information of the target from the second sensing system;
wherein the first group of the sensing devices is different from the second group of the sensing devices; and/or
wherein the first sensing configuration is different from the second sensing configuration.

12. The sensing controller of claim 11, wherein the first predefined condition comprises:
a predetermined posture and/or a predetermined motion of the target being sensed; and/or
at least one of the target's vital signs reaches its corresponding threshold.

13. The sensing controller of claim 11, wherein the number of the sensing devices in the second group is greater than the number of the sensing devices in the first group.

14. The sensing controller of claim 12, wherein:
the first sensing configuration includes a first message exchange rate among the sensing devices in the first group;
the second sensing configuration includes a second message exchange rate among the sensing devices in the second group; and
the second message exchange rate is higher than the first message exchange rate.

15. The sensing controller of claim 11, wherein the second predefined condition comprises the traffic of the second group of the sensing devices is less than the traffic of the first group of the sensing devices.

16. The sensing controller of claim 11, wherein the first information includes first position information of the target; and
the processor is further configured for:
in response to the first position information indicating position change of the target meeting a third predefined condition, scheduling a third sensing system with a third sensing configuration and a third group of the sensing devices selected from the plurality of the sensing devices and receiving third information including third status information of a target from the third sensing system.

17. The sensing controller of claim 16, wherein the third predefined condition comprises:
a distance between a central point of a sensing coverage of the third group and the changed position of the target is less than a distance between a central point of a sensing coverage of the first group and the changed position of the target.

18. The sensing controller of claim 11, wherein:
the first sensing configuration indicates one frequency band of a plurality of frequency bands having minimum traffic is to be used by the first sensing system; and/or
the second sensing configuration indicates one frequency band of the plurality of frequency bands having minimum traffic is to be used by the second sensing system.

19. The sensing controller of claim 16, wherein the sensing controller is configured to be integrated into one access point (AP) of the plurality of the sensing devices or is configured to be separate from any one of the plurality of the sensing devices.

20. A computer program product comprising a tangible computer-readable medium storing computer-executable instructions thereon, in response to execution by a processor of an apparatus for scheduling a sensing device, wherein the computer-executable instructions comprises:
scheduling a first sensing system with a first sensing configuration and a first group of sensing devices selected from a plurality of the sensing devices coupled with the sensing controller;
receiving first information including first status information of a target from the first sensing system; and
in response to the first status information indicating that a status of the target meets a first predefined condition and/or that a traffic distribution of the plurality of the sensing devices meeting a second predefined condition, scheduling a second sensing system with a second sensing configuration and a second group of the sensing devices selected from the plurality of the sensing devices, and receiving second information including second status information of the target from the second sensing system;
wherein the first group of the sensing devices is different from the second group of the sensing devices; and/or
wherein the first sensing configuration is different from the second sensing configuration.

* * * * *